United States Patent [19]

Togino et al.

[11] Patent Number: 4,802,749
[45] Date of Patent: Feb. 7, 1989

[54] SURGICAL MICROSCOPE

[75] Inventors: Takayoshi Togino, Tokyo; Hiroshi Fujiwara, Hachiouji; Yutaka Takabayashi, Hachiouji; Takashi Nagano, Hachiouji; Takashi Fukaya, Ina; Kazuyuki Minami, Musashino; Toshiyuki Tsunoda, Sagamihara, all of Japan

[73] Assignee: Olympus Optical Co., Ltd., Tokyo, Japan

[21] Appl. No.: 81,333

[22] Filed: Aug. 4, 1987

[30] Foreign Application Priority Data

Aug. 6, 1986 [JP] Japan .................. 61-183386

[51] Int. Cl.⁴ .................. G02B 21/22; G02B 21/36
[52] U.S. Cl. .................. 350/516; 350/511; 350/519; 350/502
[58] Field of Search .............. 350/516, 515, 514, 513, 350/511, 502, 145

[56] References Cited

U.S. PATENT DOCUMENTS

| | | | |
|---|---|---|---|
| 3,464,759 | 9/1969 | Scholer et al. | 350/515 |
| 3,574,295 | 4/1971 | Tasaki | 350/502 |
| 4,138,191 | 2/1979 | Peyman et al. | 350/516 |
| 4,341,435 | 7/1982 | Lang et al. | 350/515 |
| 4,518,230 | 5/1985 | Weber | 350/511 |
| 4,640,588 | 2/1987 | Tanaka | 350/516 |
| 4,688,907 | 8/1987 | Kleinberg | 350/516 |

FOREIGN PATENT DOCUMENTS

| | | | |
|---|---|---|---|
| 1217099 | 5/1966 | Fed. Rep. of Germany | 350/516 |
| 2904821 | 8/1979 | Fed. Rep. of Germany | 350/502 |
| 55-10174 | 3/1980 | Japan . | |

Primary Examiner—Jon W. Henry
Attorney, Agent, or Firm—Cushman, Darby & Cushman

[57] ABSTRACT

In order to allow the surgical operator and his assistant to make stereoscopic viewing of the region of surgery with a same magnification and in coaxial relationship, the surgical microscope comprises: a common objective lens; a pair of variable magnification optical systems disposed on the image side of the objective lens; and a pair of light beam splitting members disposed on the image side of the pair of variable magnification optical systems, respectively, wherein arrangement is provided so that paired observational optical paths are to be directed to extend respectively in a plurality of directions each having a predetermined angle relative to a plane containing the optical axes of the pair of variable magnification optical systems, within a plane crossing these optical axes at right angles, respectively. The pair of light beam splitting members are constituted as an optical path splitting unit, and the barrel section and the optical path splitting unit are removably coupled to each other.

11 Claims, 5 Drawing Sheets

SURGICAL MICROSCOPE

BACKGROUND OF THE INVENTION (a) Field of the Invention

The present invention relates to an optical microscope, and more particularly it pertains to a surgical microscope.

(b) Description of the Prior Art

In surgical operations conducted by utilizing a surgical microscope, it is being demanded that two observers, i.e. a surgical operator and his assistant who is positioned in a direction forming substantially right angles relative to the operator about the vertical central axial line of the microscope body, are able to observe the region of operation in a same state.

As the means for materializing such a demand, there is the device of the type disclosed in, for example, Japanese Patent Publication No. Sho 55-10174. This will be described hereunder by referring to FIGS. 1 and 2.

A specimen not shown is located at a position on the downward extension of a pair of operator's observational optical axes "a". In connection therewith, there are disposed on said optical axes "a" an objective lens 1, auxiliary lenses $L_a$, $L_b$, and further, light beam splitting prisms $P_1$, $P_1'$, respectively. In the directions of straightforward transmission through these light beam splitting prisms $P_1$, $P_1'$, there extend the operator's observational optical axes "a", and on their extensions, there is further disposed an binocular observational optical system not shown. The surgical operator (hereinafter to be referred to simply as "operator") makes an observation by utilizing this observational optical system. On the other hand, in the directions in which the light beams are so split and deflected by the light beam splitting prisms $P_1$, $P_1$, there extend a pair of assistant's observational optical axes "b" as shown by chain lines. On said optical axes "b" of the assistant, there is provided an assistant's binocular observational optical system which comprises prisms $P_3$, $P_3'$, $P_4$, $P_4'$, and ocular lenses 2, 2'. Accordingly, by utilizing the operator's observational light beams which have been so split by the light beam splitting means $P_1$, $P_1'$, the assistant is enabled to observe the same observational images $I_n$, $I_n'$ as for the operator.

However, with the device of the above-mentioned type, while both the operator and the assistant are capable of making an observation of the region for surgery with a same magnification and in coaxial relationship, there has been the problem from the aspect of stereoscopic viewing that, while the operator is able to obtain a stereoscopic view, his assistant is unable to obtain a stereoscopic view. This is because of the reasons that, since the light bundles coming from the operator side are led as they are to the assistant side, the bilateral view field images on the assistant's binocular observational optical system are exactly those bilateral view field images as viewed at the operator's position, so that these images will serve as the vertical view field images for the assistant, with the result that there is produced, for the assistant, no bilateral parallax necessary for his stereoscopic viewing, but instead a vertical parallax.

SUMMARY OF THE INVENTION

It is, therefore, a primary object of the present invention to provide a surgical microscope which allows both the operator and his assistant to obtain stereoscopic viewing of the region for operation with a same magnification and in coaxial relation.

This object is attained, according to the present invention, by the arrangement that light beam splitting members are provided on the rearground (image side) of a pair of bilateral variable magnification optical systems, respectively, which, in turn, are provided on the rearground (image side) of a common objective lens, whereby directing the observational light beams in two directions which form a predetermined angle relative to a plane containing the optical axes of the pair of variable magnification optical systems within a plane crossing the optical axes of the pair of variable magnification optical axes at right angles.

According to a preferred formation of the present invention, assembling of the surgical microscope can be completed only by an additional mounting of a simple optical system to the optical system of the conventional surgical microscope, so that the present invention is advantageous from the aspect of cost saving.

This and other objects as well as the features and the advantages of the present invention will be apparent from the following detailed description of the preferred embodiments when taken in conjunction with the accompanying drawings.

DETAILED DESCRIPTION OF THE PREFERRED EMBODIMENTS

Description will be made in detail, firstly, of the general concept of the surgical microscope according to the present invention by referring to FIGS. 3 to 5.

Figure 1:
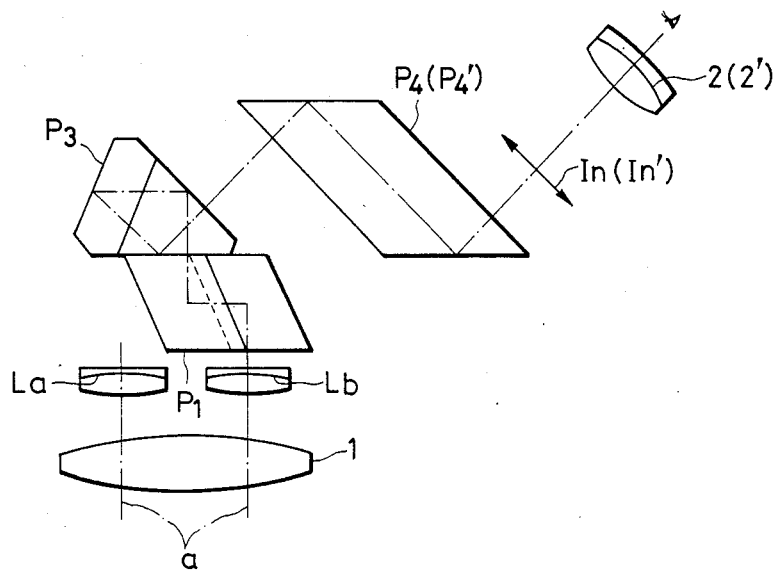
FIGS. 1 and 2 are a schematic side elevation and a schematic plan view, respectively, of the optical system employed in the conventional surgical microscope.
Figure 2:
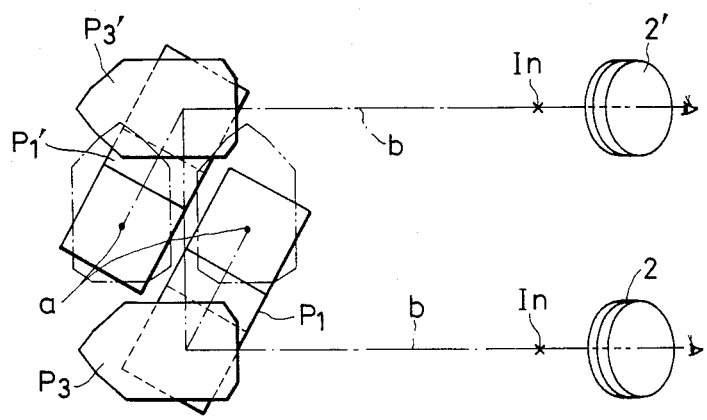
Figure 3:
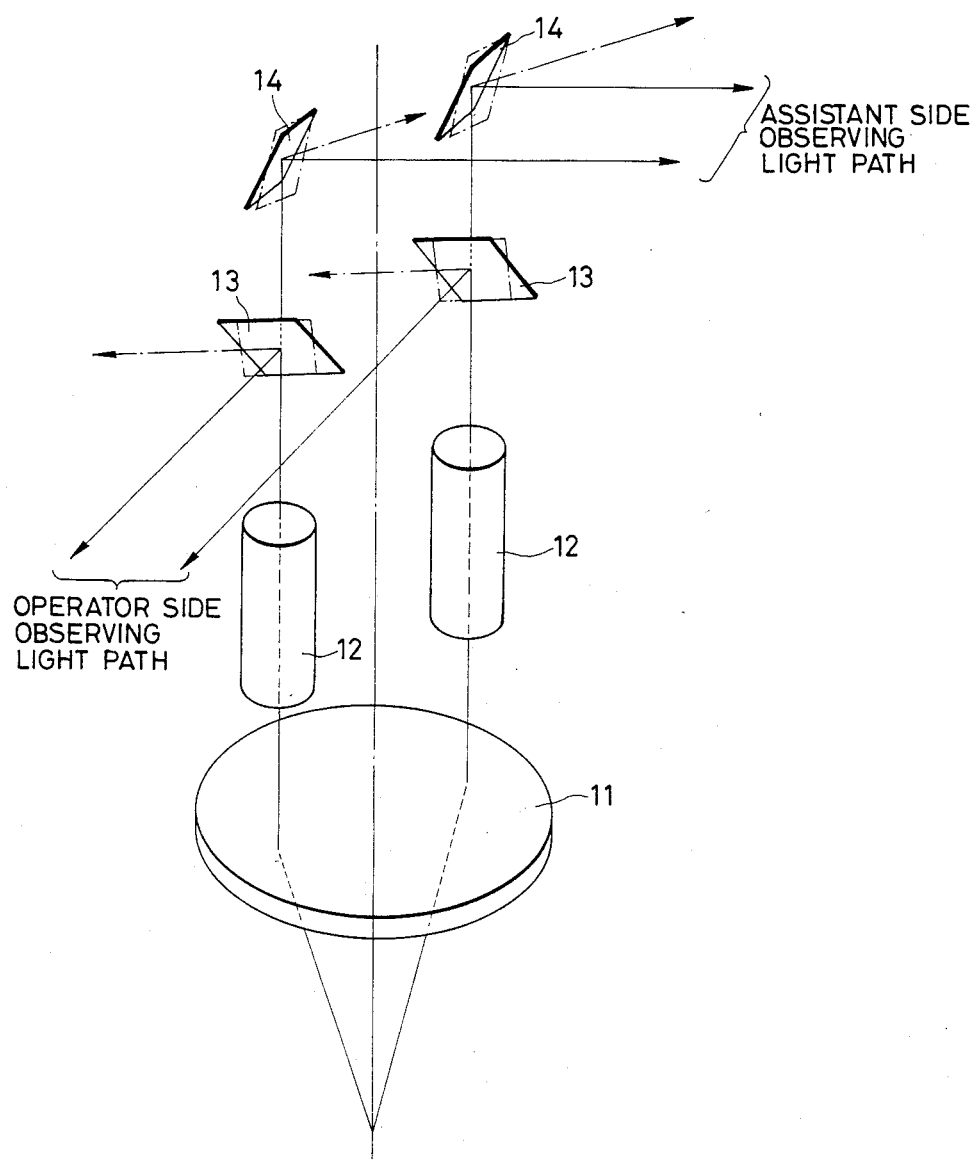
FIGS. 3 and 4 are a perspective view and a plan view, respectively, showing the structure, in principle, of the optical system employed in the surgical microscope according to the present invention.
Figure 4:
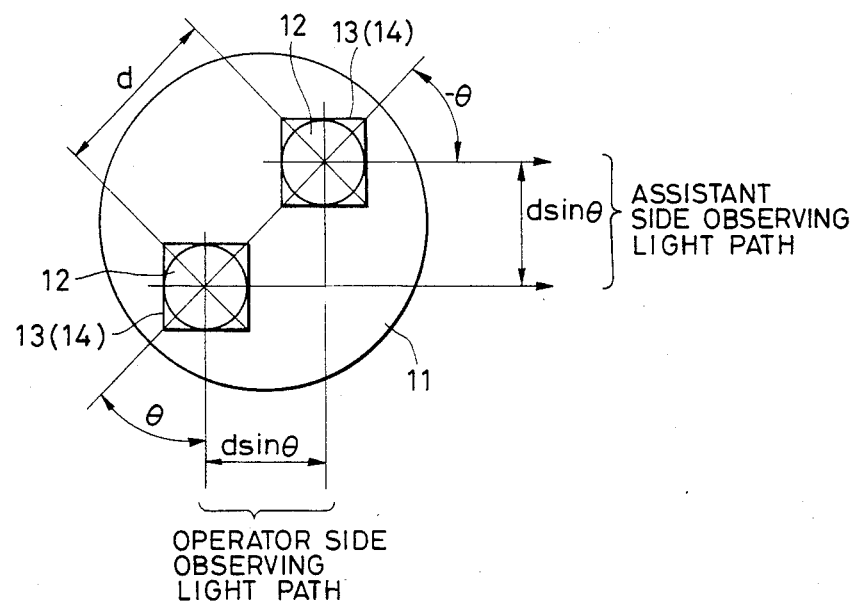

In FIGS. 3 and 4, reference numeral 11 represents an objective lens. Numerals 12, 12 are variable magnification lenses, which are provided forming a pair via an interval "d" therebetween to provide an observational optical system for stereoscopic viewing. Numerals 13, 13 represent a pair of light beam splitting members, respectively, for reflecting a part of the observational light beams having transmitted through the variable magnification lenses 12, 12 and for transmitting the rest of the light beams therethrough. These light beam splitting members are disposed so as to reflect light beams in a direction of an angle $\theta$ relative to a plane containing the optical axes of the respective variable magnification lenses 12, 12, within a plane crossing at right angles the respective optical axes of the pair of variable magnification lenses 12, 12, to thereby be useful in the formation of the operator-side observational optical paths. Numerals 14, 14 represent a pair of first reflecting members for totally reflecting the observational light beams having transmitted through the light beam splitting members 13, 13. These members 14, 14 are disposed to reflect the light beams in a direction of an angle $-\theta$ relative to a plane containing the respective optical axes of the pair of variable magnification lenses 12, 12, within a plane crossing at right angles the optical axes of the pair of variable magnification lenses 12, 12, to thereby be useful in the formation of the assistant-side observational optical paths. As will be clear from the foregoing description, the pair of optical paths on the operator side and the pair of optical paths on the assistant side invariably cross at right angles the respective optical axes of the variable magnification lenses 12, 12.

As stated above, the operator-side optical paths and the assistant-side optical paths utilize, in common, the objective lens 11 and the pair of variable magnification lenses 12, 12. Therefore, it is possible for both the operator and his assistant to make an observation of the same region of surgical operation with a same magnification by respectively using the observational optical systems (not shown) having a same structure. And, because the light beam splitting members 13, 13 and the first reflecting members 14, 14 are disposed in a manner as described above, the intervals between bilateral optical axes in the respective optical paths invariably become $d \cdot \sin \theta$, whereby a same bilateral parallax is obtained, so that a same stereoscopic viewing becomes feasible.

Figure 5:
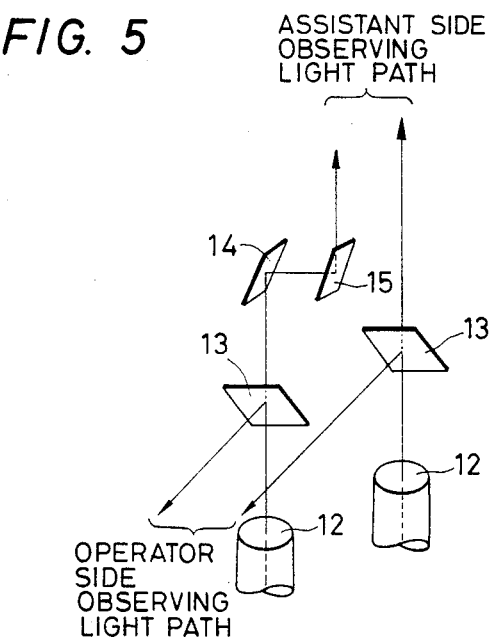
FIG. 5 is a partial perspective view of a modification of the optical system shown in FIG. 3.

It should be noted here that, unlike the arrangement described above, an arrangement may be provided so that, as shown in FIG. 5, the first reflecting member 14 is disposed only on the unilateral optical axis and also another reflecting member 15 is used to thereby form the assistant-side observational optical paths at a location above the variable magnification lenses 12, 12. Also, different from the above-described modified arrangement, there may be provided a further arrangement, as shown by chain lines in FIG. 3, that the light beam splitting members 13, 13 and the first reflecting members 14, 14 are disposed respectively in such a way that the operator-side observational optical paths and the assistant-side observational optical paths cross the respective optical axes of the pair of variable magnification lenses 12, 12 at an angle other than 90°.

In the above-described instance, the operator-side observational optical paths and the assistant-side observational optical paths are each inclined for an equal angle ($\theta$) relative to a plane containing the optical axes of the respective variable magnification lenses 12, 12, within a plane crossing at right angles the respective optical axes of the pair of variable magnification lenses 12, 12, to allow both the operator and his assistant to make an observation of such an image as providing the same stereoscopic sense to these two persons. In practice, however, the two persons' respective observational optical paths may not necessarily be inclined with an equal angle as stated above, in order to enable the operator to make an observation of an image richer in stereoscopic sense, or to set the angle formed by the operator-side observational optical path and the assistant-side observational optical path at a certain desired value.

Figure 6:
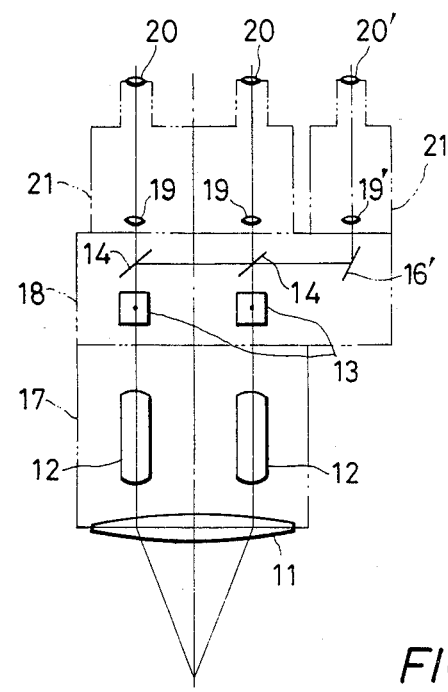
FIGS. 6 to 8 are a front view, a side elevation and a plan view, respectively, of a first embodiment of the surgical microscope according to the present invention.
Figure 7:
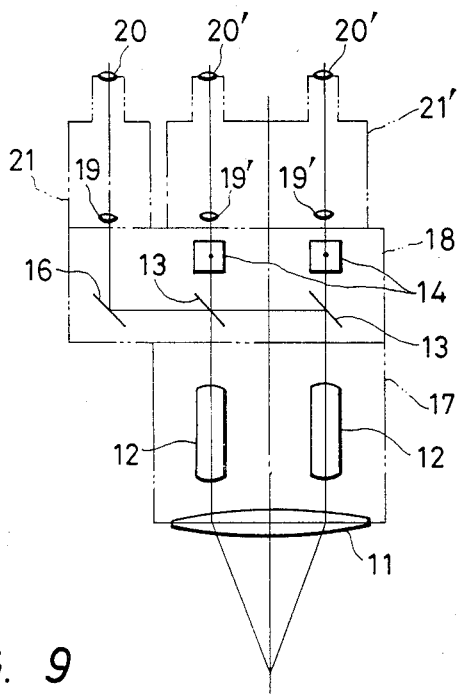
Figure 8:
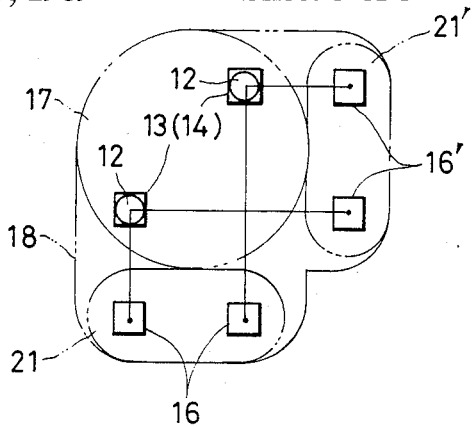

Description of the present invention will be made hereunder in further detail with respect to an embodiment illustrated in FIGS. 6 to 8.

Numerals 16, 16; 16', 16' represent reflecting members. These reflecting members are disposed in two pairs on both the operator-side and the assistant-side optical paths for being used to deflect these respective optical paths in an upward direction. Here, the objective lens 11 and the variable magnification lenses 12, 12 jointly constitute a barrel section 17. The pair of light beam splitting members 13, 13 and the pair of first reflecting members 14, 14 and the two pairs of reflecting members 16, 16; 16', 16' jointly constitute an optical path splitting unit 18. Also, numerals 19, 19; 19', 19' represent focusing lenses disposed on the respective optical paths; 20, 20; 20', 20' ocular lenses disposed on the respective optical paths, and these members jointly constitute tube sections 21, 21'. It should be noted here that usually these tube sections 21, 21' employ optical members, respectively, either for providing a normal erect image or for altering the angle of emission from the ocular lenses 20, 20; 20', 20', but they are omitted here for the simplicity of description. Furthermore, in this instant embodiment, the angle $\theta$ is set to be 45°, and arrangement is provided so that the operator-side observational optical paths cross the assistant-side optical paths at right angles with each other. Furthermore, in this embodiment, the optical paths are split in the horizontal direction, respectively, by the light beam splitting members 13, 13 and also by the first reflecting members 14, 14. The direction of splitting the optical paths may not be horizontal in particular.

The first embodiment is arranged as described above. Therefore, the observational light beams having transmitted through a pair of variable magnification lenses 12, 12 enter the optical path splitting unit 18. A pair of light bundles which have been so split firstly by being reflected by the pair of light beam splitting members 13, 13, respectively, are then further deflected in an upward direction, respectively, by a pair of reflecting members 16, 16, and via a pair of focusing lenses 19, 19 and a pair of ocular lenses 20, 20 housed in a tube section 21, a stereoscopic image is observed. On the other hand, a pair of light bundles which have passed through the pair of light beam splitting members 13, 13, respectively, are totally reflected respectively by a pair of first reflecting members 14, 14 and these reflected light bundles are deflected upwardly by a pair of reflecting members 16', 16', and via a pair of focusing lenses 19', 19' and a pair of ocular lenses 20', 20' housed in a tube section 21', there is observed a stereoscopic image. Accordingly, it becomes possible for two persons to make stereoscopic observations of a same region of surgery under the same conditions.

Figure 9:
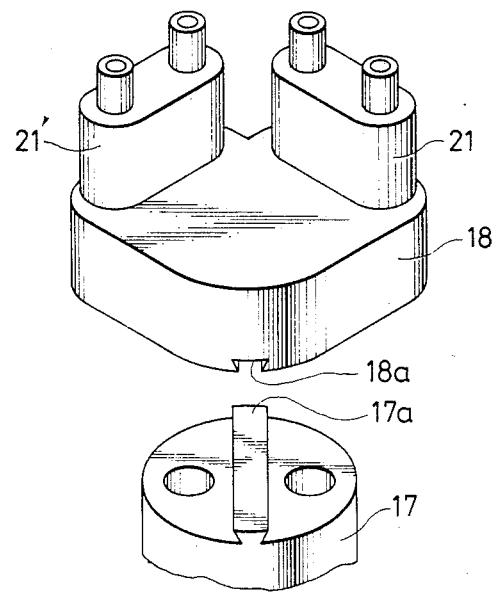
FIG. 9 is a partial perspective view showing an example of the coupling structure between the barrel section and the optical path splitting unit.

Also, according to the above-stated first embodiment, only by coupling an assembly including the light beam splitting unit 18 and the tubes 21, 21' to the barrel section 17 of an ordinary surgical microscope (stereoscopic microscope) by using a coupling means comprising, for example, a dovetail 17a and a dovetail groove 18a as shown in FIG. 9, two persons are allowed to make stereoscopic observations of a same region of surgery under the same conditions. Thus, the conventional surgical microscope can be utilized as it is, requiring no modification, so that the economical burden can be suppressed. Furthermore, when not required, the above-mentioned assembly is removed from the microscope body to render the microscope assembly to an ordinary surgical microscope, so that it is possible to prevent the size of the microscope as a whole from being augmented. Also, by arranging so that a light beam splitting member 13 and a reflecting member 16 corresponding to this light beam splitting member 13 can be rotated as an integral unit about each of the respective optical axes of the pair of variable magnification lenses 12, 12 and that a first reflecting member 14 and a reflecting member 16 corresponding to the first reflecting member 14 can be rotated as an integral unit thereabout, and also that, along therewith, the intervals between the optical axes of the respective light beams on the emission side of the optical path splitting unit 18 are preliminarily set so as to agree with the intervals "d" between the optical axes on the incidence side, there can be utilized the tubes of an ordinary surgical microscope even in case the light beam splitting unit 18 is used, and thus the device can become all the more advantageous from the economical point of view.

Figure 10:
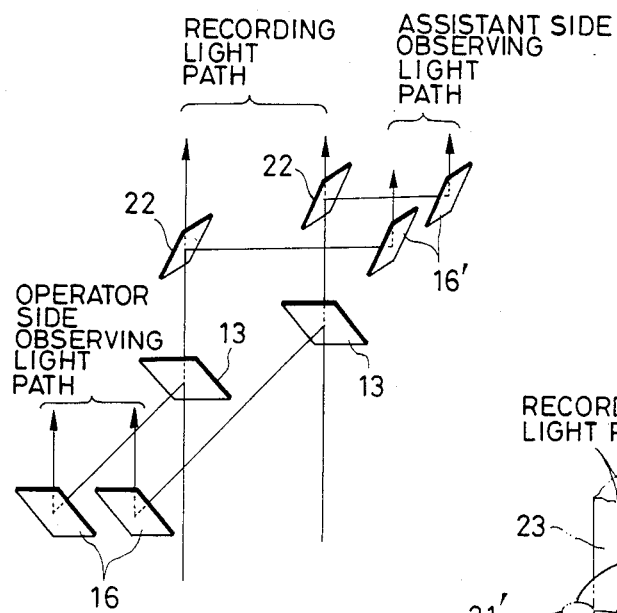
FIG. 10 is a structural view of the essential portion of the optical system of a second embodiment of the surgical microscope according to the present invention.
Figure 11:
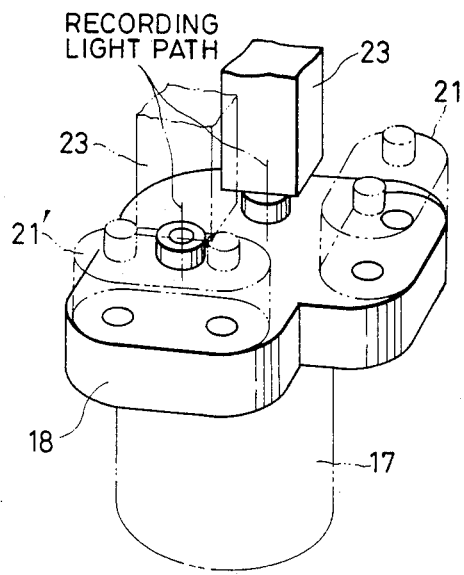
FIG. 11 is a perspective view of the optical path splitting unit in said second embodiment.

Next, referring to FIGS. 10 and 11, a second embodiment of the present invention will be described. This second embodiment makes feasible the mounting of a recording member which bears a high degree of necessity in actual surgical operations. More particularly, as a pair of first reflecting members, there are used half mirrors 22, 22, whereby the optical paths of the light beams transmitting therethrough in an upward direction are utilized to serve as the light paths for recording, and recording member 23 is held on the light beam splitting unit 18.

This second embodiment has the advantage that the space located between a pair of tube sections 21, 21' which are present above the barrel section 17 can be effectively utilized, so that the manipulating operations by both the operator and his assistant are not obstructed throughout the surgical operation. Also, there is another advantage such that the heavy recording members 23, 23 are positioned on substantially the centers of gravity of the tubes 21, 21', respectively, so that safety can be maintained desirably even in case the microscope is tilted for elevational angles.

As stated above, according to the surgical microscope of the present invention, there are provided the advantages that both the operator and his assistant are allowed to jointly make stereoscopic viewing of the region of surgery with a same magnification and in coaxial relationship, with the result that the assistant can provide sufficient assistance to the operator, thus enhancing the safety in surgery and realizing a reduction of time length of the surgical operation, and furthermore that surgical education can be provided by the guidance conducted on the part of the assistant. Also, only by the addition of a simple optical system to the optical system of the existing surgical microscope, the above-described effects and advantages can be obtained, so that there also is the advantage that economical burden can be reduced substantially.

What is claimed is:

1. A surgical microscope, comprising:
   a common objective lens;
   a pair of variable magnification optical systems disposed to face each other on the image side of said common objective lens; and
   a pair of light beam splitting members disposed on the image side of said pair of variable magnification optical systems, respectively, wherein:
   one of two pairs of optical paths split by said pair of light beam splitting members is adapted to be directed to extend in a direction having a predetermined angle other than a right angle relative to a plane containing respective optical axes of said pair of variable magnification optical systems, within a plane crossing at right angles the respective optical axes of said pair of variable magnification optical systems.

2. A surgical microscope according to claim 1, further comprising:
   a pair of first reflecting members disposed to direct the other pair of the two pairs of optical paths having been split by said pair of light beam splitting members to extend in a direction in which said other pair of optical paths cross said one of the two pairs of optical paths at right angles, respectively, within a plane crossing at right angles the respective optical axes of said pair of variable magnification optical systems.

3. A surgical microscope according to claim 1, further comprising:
   a pair of reflecting members disposed to direct one of the optical paths of the other pair among the two pairs of optical paths having been split by said pair of light beam splitting members is bent twice to direct same to extend in a direction parallel with the respective optical axes of said pair of variable magnification optical systems, so that said optical paths of the other pair become again optical paths to obtain a stereoscopic view.

4. A surgical microscope, comprising:
   a common objective lens;
   a pair of variable magnification optical systems disposed to face each other on the image side of said common objective lens; and
   a pair of light beam splitting members disposed on the image side of said pair of variable magnification optical systems, respectively, wherein:
   one of the two pairs of optical paths having been split by said pair of light beam splitting members is adapted to be directed to extend in a direction having a predetermined angle other than a right angle relative to a plate containing respective optical axes of said pair of variable magnification optical systems, within a plane having a predetermined angle relative to a plane crossing at right angles the respective optical axes of said pair of variable magnification optical systems.

5. A surgical microscope according to claim 4, further comprising:
   a pair of reflecting members disposed to direct the other of the two pairs of optical paths having been split by said pair of light beam splitting members to extend in a direction having a predetermined angle relative to a plane containing respective optical axes of said pair of variable magnification optical systems, within a plane having a predetermined angle relative to a plane crossing at right angles the respective optical axes of said pair of variable magnification optical systems.

6. A surgical microscope according to claim 2 or 4, further comprising:
   a pair of second reflecting members disposed to direct said one of the two pairs of optical paths to extend upwardly in parallel with the respective optical axes of said pair of variable magnification optical systems;
   a pair of third reflecting members disposed to direct the other of the two pairs of optical paths having been reflected respectively by said pair of first reflecting members to extend respectively upwardly in parallel with the respective optical axes of said pair of variable magnification optical systems;

a pair of first focusing lenses and a pair of first ocular lenses disposed, respectively, in successive order on the optical paths, respectively, of said one of the two pairs of optical paths having been so bent by said pair of second reflecting members, respectively; and a pair of second focusing lenses and a pair of second ocular lenses disposed, respectively, in successive order on the optical paths, respectively, of the other of the two pairs of optical paths which have been bent by said pair of third reflecting members, respectively.

7. A surgical microscope according to claim 6, in which:

said common objective lens and said pair of variable magnification optical systems jointly constitute a barrel section, said pair of light beam splitting members, said pair of second reflecting members and said pair of third reflecting members jointly constitute an optical path splitting unit, said pair of first focusing lenses and said pair of first ocular lenses jointly constitute a first tube section, and said pair of second focusing lenses and said pair of second ocular lenses jointly constitute a second tube section.

8. A surgical microscope according to claim 7, in which:

said barrel section and said optical path splitting unit are removably coupled together.

9. A surgical microscope according to claim 1 or 4, further comprising:

first reflecting members disposed to direct one pair of the two pairs of optical paths having been split by said pair of light beam splitting members to extend upwardly in parallel with respective optical axes of said pair of variable magnification optical systems;

a pair of other light beam splitting members disposed on the optical axes, respectively, of said pair of variable magnification optical systems to further split into two the other pair of the two pairs of optical paths having been split already by said pair of light beam splitting members;

second reflecting members disposed to direct one of the two pairs of optical paths having been so split already by said pair of further light beam splitting members to extend upwardly in parallel with respective optical axes of said pair of variable magnification optical systems;

a pair of first focusing lenses and a pair of first ocular lenses disposed respectively in successive order on respective optical paths of said pair of optical paths having been bent already by said pair of first reflecting members, respectively;

a pair of recording members disposed on the optical paths, respectively, of the other of the two pairs of optical paths having been so split by said pair of further light beam splitting members; and a pair of second focusing lenses and a pair of second ocular lenses disposed respectively in successive order on respective optical paths of said pair of second reflecting members, respectively.

10. A surgical microscope according to claim 9, in which:

said common objective lens and said pair of variable magnification optical systems jointly constitute a barrel section;

said pair of light beam splitting members, said pair of first reflecting members, said pair of second light beam splitting members said pair of second reflecting members jointly constitute a light path splitting unit;

said pair of first focusing lenses and said pair of first ocular lenses jointly constitute a first tube section projecting from the top surface of said optical path splitting unit;

said pair of second focusing lenses and said pair of second ocular lenses jointly constitute a second tube section projecting, adjacent to said first tube section, from the top surface of said optical path splitting unit; and said pair of recording members is provided on the top surface of said optical path splitting unit.

11. A surgical microscope according to claim 10, in which:

said optical path splitting unit and said barrel section are removably coupled together.

* * * * *